US007007098B1

(12) United States Patent  
Smyth et al.

(10) Patent No.: US 7,007,098 B1  
(45) Date of Patent: Feb. 28, 2006

(54) METHODS OF CONTROLLING VIDEO SIGNALS IN A VIDEO CONFERENCE

(75) Inventors: Joseph Smyth, Galway (IE); Tony McCormack, Galway (IE)

(73) Assignee: Nortel Networks Limited, St. Laurent (CA)

( * ) Notice: Subject to any disclaimer, the term of this patent is extended or adjusted under 35 U.S.C. 154(b) by 766 days.

(21) Appl. No.: 09/640,701

(22) Filed: Aug. 17, 2000

(51) Int. Cl.  
*G06F 15/16* (2006.01)

(52) U.S. Cl. ....................... 709/233; 709/204; 709/228

(58) Field of Classification Search ................ 709/204, 709/228, 217, 226, 233; 370/260, 352, 468, 370/493, 231; 348/14, 14.01; 379/202.01  
See application file for complete search history.

(56) References Cited

U.S. PATENT DOCUMENTS

| | | | | |
|---|---|---|---|---|
| 5,434,913 | A * | 7/1995 | Tung et al. | 379/202.01 |
| 5,550,906 | A * | 8/1996 | Chau et al. | 379/201.05 |
| 5,594,725 | A * | 1/1997 | Tischler et al. | 370/260 |
| 5,623,312 | A * | 4/1997 | Yan et al. | 375/240.16 |
| 5,867,494 | A * | 2/1999 | Krishnaswamy et al. | 370/352 |
| 5,991,277 | A * | 11/1999 | Maeng et al. | 370/263 |
| 6,091,777 | A * | 7/2000 | Guetz et al. | 375/240.11 |
| 6,128,649 | A * | 10/2000 | Smith et al. | 709/217 |
| 6,373,855 | B1 * | 4/2002 | Downing et al. | 370/468 |
| 6,373,860 | B1 * | 4/2002 | O'Toole et al. | 370/493 |
| 6,404,745 | B1 * | 6/2002 | O'Neil et al. | 370/260 |
| 6,490,275 | B1 * | 12/2002 | Sengodan | 370/356 |
| 6,529,475 | B1 * | 3/2003 | Wan et al. | 370/231 |
| 6,816,904 | B1 * | 11/2004 | Ludwig et al. | 709/226 |

FOREIGN PATENT DOCUMENTS

EP 1077565 A1 * 2/2001

OTHER PUBLICATIONS

MCU-323 Multipoint Conferencing Unit version 2.1 User Guide, Ed.3 Jul. 2000.*  
Video and Conferencing, available at www.microsoft.com/windows/Netmeeting/Features/Conferencing/default.ASP, date unknown.

* cited by examiner

*Primary Examiner*—Le Hien Luu  
(74) *Attorney, Agent, or Firm*—Barnes & Thornburg LLP

(57) ABSTRACT

A method of controlling video signals in a multi-participant video conference involves assessing the level of video signal required from each participant to mix the desired broadcast video signals, and using the result of this assessment to dynamically control the video output from the endpoints of the conference participants. The assessment of the required level of video signal preferably utilizes an audio mixing algorithm, such that the video outputs of those participants whose audio signals are currently being discarded in the audio mixing process are switched off at the endpoints, or are transmitted in a lower bandwidth format, thereby reducing the overall bandwidth requirements of the conference and reducing processor resources to mix the broadcast video signals.

37 Claims, 5 Drawing Sheets

| ENDPOINT: | A | B | C | |
|---|---|---|---|---|
| VIDEO IN PORT NO. | | | | ← 36 |
| VIDEO OUT PORT NO. | | | | ← 38 |
| AUDIO IN PORT NO. | | | | ← 40 |
| AUDIO OUT PORT NO. | | | | ← 42 |
| SIGNALLING PORT No. | | | | ← 44 |
| CURRENT STATUS VIDEO ON/OFF | | | | ← 46 |

METHODS OF CONTROLLING VIDEO SIGNALS IN A VIDEO CONFERENCE

FIELD OF THE INVENTION

The present invention relates to methods of video conferencing. The invention has particular application in the processing of video streams transmitted as part of a packet-based video conference.

BACKGROUND OF THE INVENTION

Desktop video-conferencing using packet-based transport mechanisms is gaining popularity in the market-place. The technology has particular potential for establishing video conferences over the Internet or other data networks employing the Internet Protocol (IP). The technology is similar to that used in the more established Voice-over-IP arena with the signaling protocols the same for both.

Typically, a signaling channel such as H.323 (from the International Telecommunications Union (ITU)) or Session Initiation Protocol (SIP) from the Internet Engineering Taskforce (IETF) is used to establish voice, video and data channels between multiple participants.

Each participant in such a call is referred to as a multimedia endpoint, or endpoint for short. It should be noted that an endpoint may be a logical entity as well as a physical terminal. For example the audio stream may originate from a desktop telephone set whereas the video originates from an adjacent personal computer or other similar device capable of transmitting video. As part of the call set-up these distinct devices are logically represented and presented as a single endpoint. Similarly, the audio, video and other media "streams" may in fact be carried as a single multiplexed signal over a single physical channel. Nevertheless this single multiplexed channel can be viewed as consisting of a number of logically distinct media channels.

The following is a description, given by way of example, of a typical packet-based video-conference implemented in accordance with ITU Recommendation H.323. The H.323 standard is described in the Recommendation H.323 document published by the Telecommunications Sector of the International Telecommunications Union (ITU-T) under the title "Packet Based Multimedia Communications Systems". This is an umbrella for a set of standards describing equipment, terminals and services for multimedia conferencing over networks such as the Internet.

Multiple participants or endpoints connected to a packet-based data network establish signaling and media channels with a combined conference and call server which is a physical embodiment of the H.323 entity known as a Multipoint Control Unit (MCU). The MCU incorporates a Multipoint Controller (MC) and a Multipoint Processor (MP).

The MC processes the signalling channels from the endpoints and thereby provides the call control capability to negotiate with all endpoints and achieve common levels of communication. The MC also interfaces with the MP.

The MP allows mixing, switching and other processing of media streams under the control of the MC. Thus, the MP manages the media streams coming from the endpoints, and mixes the streams which are transmitted to the endpoints.

In alternative implementations, the MC may be incorporated in a call server, and the MP incorporated in a physically separate conference server, so that the MP has media and data channels re-directed to it by the MC which terminates the signaling channel from each endpoint.

In either case, for each incoming audio stream, the MP normally employs a mixing mechanism to collate and distribute the various combinations of voice packets to each endpoint. This mechanism can either mix all voice channels or use a more advanced algorithm to, for example, identify the N loudest speakers and mix and distribute only those.

To handle multiple video streams, the MP may also choose a mixing strategy, where the mixing takes the form of combining the video streams from all participants into a "picture-in-picture" image, containing reduced images of all conference participants, and then transmitting this combined image to each endpoint, so that all participants may be viewed from each desktop. This has certain merits, but if an MP is required to host a large number of conferences, each with a large number of participants, this mixing may prove wasteful of valuable MP resources.

Although the combination of video images in this way has its merits for the participants, it requires the MP to decode each signal, reduce the image to the required size, mix this reduced image with each of the other reduced images to form a combined image, and then encode this image according to the codec being used by each endpoint.

It will be appreciated that if an MP is required to host a large number of conferences, each with a large number of participants, these processor-intensive decode, mix and encode operations on each signal may prove wasteful of valuable MP resources.

A further difficulty with this type of mixing is that for large conferences, the end result may be of limited use to each participant. For example, if a conference has 20–30 participants, the individual images received in the "picture-in-picture" image may not be of high enough resolution to be usable.

As an alternative to mixing all of the video streams, a common approach that is used is for the MP to distribute the video stream of the loudest speaker to all of the other conference participants. (The loudest speaker in this scenario generally receives the video stream of the second loudest speaker.)

This idea can be extended to incorporate an audio mixing algorithm which picks out the N loudest speakers (where N is a small number (typically 2–3) compared to the number of endpoints in the conference) and for the MP to mix the video streams from these endpoints only.

The advantages of these two approaches are clear. When only the video stream of the loudest speaker is distributed (along with the video of the second loudest speaker to the loudest speaker), the MP need not perform any processor-intensive mixing operations. When the video streams of the N loudest speakers is mixed (with N being substantially less than the total number of participants), the processing power required by the MP is substantially reduced compared to mixing the video from all participants. Both mechanisms model typical voice conference calls quite well where there is typically a small number of active participants (talkers) and a number of passive participants (listeners).

SUMMARY OF THE INVENTION

The invention provides a method of controlling video signals in a video conference which includes a number of participants (or endpoints). The method involves using pre-defined rules to decide how the video signal from any one of the participants is to be transmitted to the other participants (i.e. determining the degree to which this video signal is to be transmitted), and then using the result of this decision to dynamically control the video output from the selected participant's endpoint.

By "determining the degree" to which the video signal is to be transmitted, we mean deciding whether the signal is to be re-transmitted at all, and if so, optionally deciding on the quality of signal required in the re-transmitted video signal.

For example, if a limited "picture-in-picture" video image is generated to include a full size image of the current loudest speaker, and inset thumbnail images of the two previous loudest speakers, then it might be determined that (i) no video signals at all are required from any participants other than the three mentioned above, (ii) low resolution images only are required from the two previous loudest speakers, and (iii) maximum quality video images are required from the current loudest speaker.

In such a case, the method of the invention might be applied to each endpoint in the conference according to this determination, by respectively (i) switching off video output entirely, (ii) reducing frame rate or pixel resolution, and (iii) maintaining high quality video output.

While known video systems require the network to carry the video outputs from all endpoints, even if they are subsequently discarded, the invention allows each endpoint to reduce its video output to a level appropriate to its subsequent re-use as a broadcast video signal.

Furthermore, for known packet-based video conferences (such as over the Internet or over a local area network), the conferencing server is required to receive and handle all incoming packets before determining which signals can be discarded. In contrast the invention allows the server only to receive relevant packets of information, i.e. those that are to be used in generating broadcast signals. This has a significant impact on the amount of processing resources used by the server.

While reference is made above to a "video conference", this is to be interpreted to include both video-only conferences and any multimedia conference which includes video (along with other media such as voice or data). For reasons which will become clearer, the invention has particular application in multimedia conferences which include both audio and video conferences.

A preferred way to determine the degree to which a video signal from one endpoint is to be transmitted to other endpoints within the conference, is to analyse audio signals from the endpoints. In other words, since most participants wish the video and audio aspects of a conference to be correlated, the processing of the audio signals may be used to determine how the corresponding video signals should be used.

The analysis of audio signals may be done by applying an audio mixing algorithm to the audio signals, and using a result of this algorithm to determine the degree to which a video signal is to be transmitted to endpoints within the conference.

Some of the algorithms which may be used are "loudest speaker only", "N loudest (current) speakers", "N loudest most recent speakers", or any other desired determination of one or more speakers.

In many cases, the audio mixing algorithm results in audio signals from only a subset of the endpoints being transmitted to all of the endpoints. Preferably in such cases the video signals from only this subset of endpoints are transmitted to all of the endpoints. For example, if the audio mixing algorithm identifies A,B and C as the current loudest speakers, and generates an audio mix of these three audio signals, this information can be used to determine that the video signals from A, B and C are required at full quality, and that no other endpoint video signals are needed.

Alternatively, the video signals from the subset of endpoints may be transmitted to all endpoints as higher quality video images than the video signals from the other endpoints outside the subset. Using the previous example, participants might receive high-resolution images of participants A, B and C, and receive low resolution thumbnails of all other participants. On this basis, the other participants do not need to send full quality video, and bandwidth and processing time can be reduced by having these other endpoints transmit using a lower frame rate, with a smaller number of pixels, with a higher degree of compression, or using a different video codec, for example.

As indicated above, the method of the invention is preferably applied to more than one endpoint, more preferably to all endpoints in the conference.

The step of controlling the video output from the or each endpoint can involve terminating the video output from any endpoint during periods when the video signals from that endpoint are not being transmitted to endpoints within the conference, and recommencing the video output from that endpoint when it is determined that the video signals from the endpoint are to be transmitted to one or more endpoints within the conference.

Alternatively, the step of controlling the video output from an endpoint can involve providing a lower bandwidth video output from the endpoint during periods when the video signals from the endpoint are being transmitted to other endpoints with a reduced image quality.

Both the cease/recommence option and the reduce/increase bandwidth option can be used with one another, if required by the endpoints or if the nature of the broadcast video signal involves omitting some endpoint images entirely and transmitting other endpoint images at different quality levels.

When the conference is carried out on a packet-based data network the lower bandwidth video output may be provided by altering the video output in a manner which provides reduced numbers of packets from said endpoint, and thereby reduces network traffic.

In another aspect the invention provides a method of controlling video signals in a multimedia conference involving a number of endpoints communicating with at least audio and video signals over a packet-based data network, the method involving the steps of:

applying an audio mixing algorithm to the audio signals, and using a result of the algorithm to determine the degree to which the video signals from one or more endpoints are to be transmitted to endpoints within the conference; and dynamically varying the video output from those one or more endpoints as a result of the determination.

Preferably, the step of dynamically varying the video output from the endpoint(s) comprises sending control signals to the endpoint(s), with the control signal being selected from "cease video output" signals, "commence video output" signals, "reduce bandwidth of video output" signals, and/or "increase bandwidth of video output" signals.

Optionally, the variation in video output occurs effectively instantaneously as the result of the algorithm varies over time.

Thus, if the video from only the current loudest speaker is required, the cease/commence signals can be sent immediately a new participant becomes the loudest speaker.

Preferably, however, the variation in video output is subject to a hysteresis delay to compensate for short-lived variations in the result of the algorithm over time. Many audio mixing algorithms already employ hysteresis type algorithms to determine the loudest speaker, and such algorithms can be adapted for the present invention, if it is decided to employ a hysteresis delay.

For example, if a non-speaking participant coughs, or other extraneous noise is transmitted to the conference, this might be interpreted in the algorithm as a reason to change to a new loudest speaker. A hysteresis delay can overcome this by introducing a lag into the system. Only when a new speaker becomes, and remains, the loudest audio signal for a predetermined delay time, are the control signals sent to vary the video outputs of the endpoints.

The invention also provides a method of controlling a multimedia conference involving a number of endpoints communicating with at least audio and video signals over a packet-based data network, involving the steps of:

selecting the audio signals from a subset of endpoints and generating from these signals at least one broadcast audio signal for transmission to the plurality of endpoints;

selecting the video signals from the same subset of endpoints and generating from these video signals at least one broadcast video signal for transmission to the plurality of endpoints; and dynamically controlling the video output from each of the endpoints in the conference in accordance with the characteristics of video signal required from each endpoint to generate the broadcast video signal.

It should be noted here that in practice, more sophisticated conferencing systems will generate more than one broadcast audio signal and more than one broadcast video signal, the reason being that active speakers will not typically hear and see themselves, and thus their conference outputs will be different to those of currently passive participants.

In a further aspect the invention provides a multimedia conferencing server having:

a number of audio and video ports for connecting audio and video channels from endpoints to the server over a data network;

a memory unit for associating the audio and video channels from each endpoint;

an audio processing unit for receiving audio signals from audio ports and generating broadcast audio signals for transmission to the endpoints via the audio ports;

a video processing unit for receiving video signals from the video ports and generating broadcast video signals for transmission to the endpoints via the video ports; and a control unit for generating control signals to control the video outputs from the endpoints in the manner required to generate the broadcast video signals.

Thus, the server of the invention incorporates a control signalling facility for generating dynamic video control signals to suit the broadcast requirements.

In one embodiment the multimedia conferencing server of the invention has a plurality of signalling ports for connecting endpoints to the control unit of the conferencing server via the data network over signalling channels, so that the control signals are issued directly from the server to the endpoints.

In another embodiment the multimedia conferencing server of the invention has one or more control channel ports for connection to a call server, with the endpoints being connected to the call server over signalling channels, so that the control signals are relayed from the conferencing server to the endpoints via the call server. In most cases, the relaying of the signals will involve the call server receiving the control signals from the conferencing server and then generating corresponding signals for transmission to the endpoints.

The invention further provides a multimedia conferencing system including a conference server as described above and a call server as described above. The system may also include a data network for carrying the audio, video and control signals, and it may include a plurality of endpoints connected to the conference server and call server via the data network.

In a further aspect the invention provides a computer program product containing instructions to cause a computer associated with a video conference server to:

determine, according to a predetermined function, the degree to which a video signal from an endpoint communicating with the server is to be transmitted to other endpoints communicating with the server; and issue control signals based on this determination to the endpoint in question to dynamically control the video output from the endpoint.

Optionally, when the computer determines a change in the degree to which the video signal is to be transmitted, there may be instructions in the program to cause the computer to observe a hysteresis delay before issuing different control signals to the endpoint.

If the computer then determines, within the hysteresis period, a reversal of the change in the degree to which the video signal is to be transmitted, the program prevents the computer from issuing different control signals to the endpoint.

Preferably, the computer program product also includes instructions to cause the computer to maintain a data structure in which the current status of the video output from the or each endpoint is recorded.

This data structure (which may be included as a simple database) allows the computer to e.g. carry out an audio mixing algorithm, and then simply compare the results of the algorithm with the current status of each endpoint recorded in the database, to determine what signals, if any, should be sent to the endpoints in the light of any change in the algorithm result.

BRIEF LIST OF DRAWINGS

The invention will now be illustrated by the following descriptions of embodiments thereof given by way of example only with reference to the accompanying drawings, in which:

FIG. 3 is a representation of the data structure maintained by the conferencing server during a conference employing the method of the invention;

DETAILED DESCRIPTION OF PREFERRED EMBODIMENTS

Figure 1:
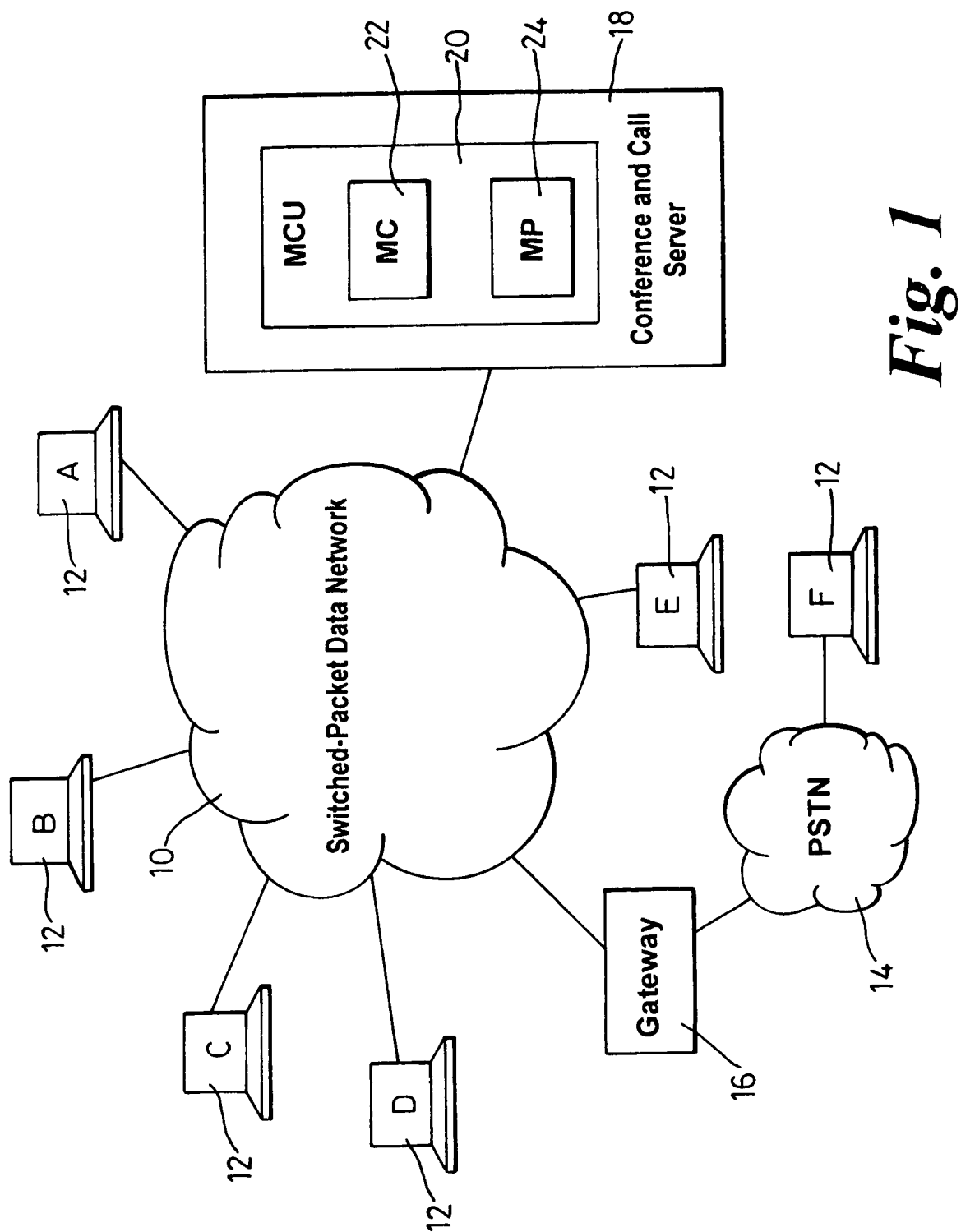
FIG. 1 is a simplified diagrammatic view of a video conferencing architecture.

FIG. 1 shows a typical multimedia conferencing architecture typically used in conducting multimedia conferences over a packet-based data network 10 such as the Internet or a Local Area Network (LAN).

A number of multimedia terminals or endpoints 12A–12F are connected to the network 10. Endpoints 12A–12E are endpoints supporting IP signalling such as H.323 video conferencing. Terminal 12F on the other hand is connected to an analog PSTN 14. Because the PSTN does not carry data packets, a gateway 16 acts as the interface between the PSTN 14 and network 10 (gateway 16 is a H.323 entity). Therefore, the network 10 sees the gateway 16 as an endpoint and references to endpoint 12F should include PSTN 14 and gateway 16.

A combined call and conferencing server 18 connected to the network 10 acts as an integrated MCU 20 having both MC 22 and MP 24 functionality. Thus, server 18 organises the conference set up, assigns the signalling and media streams to and from the endpoints to various ports, and performs the media mixing during the conference.

Figure 2:
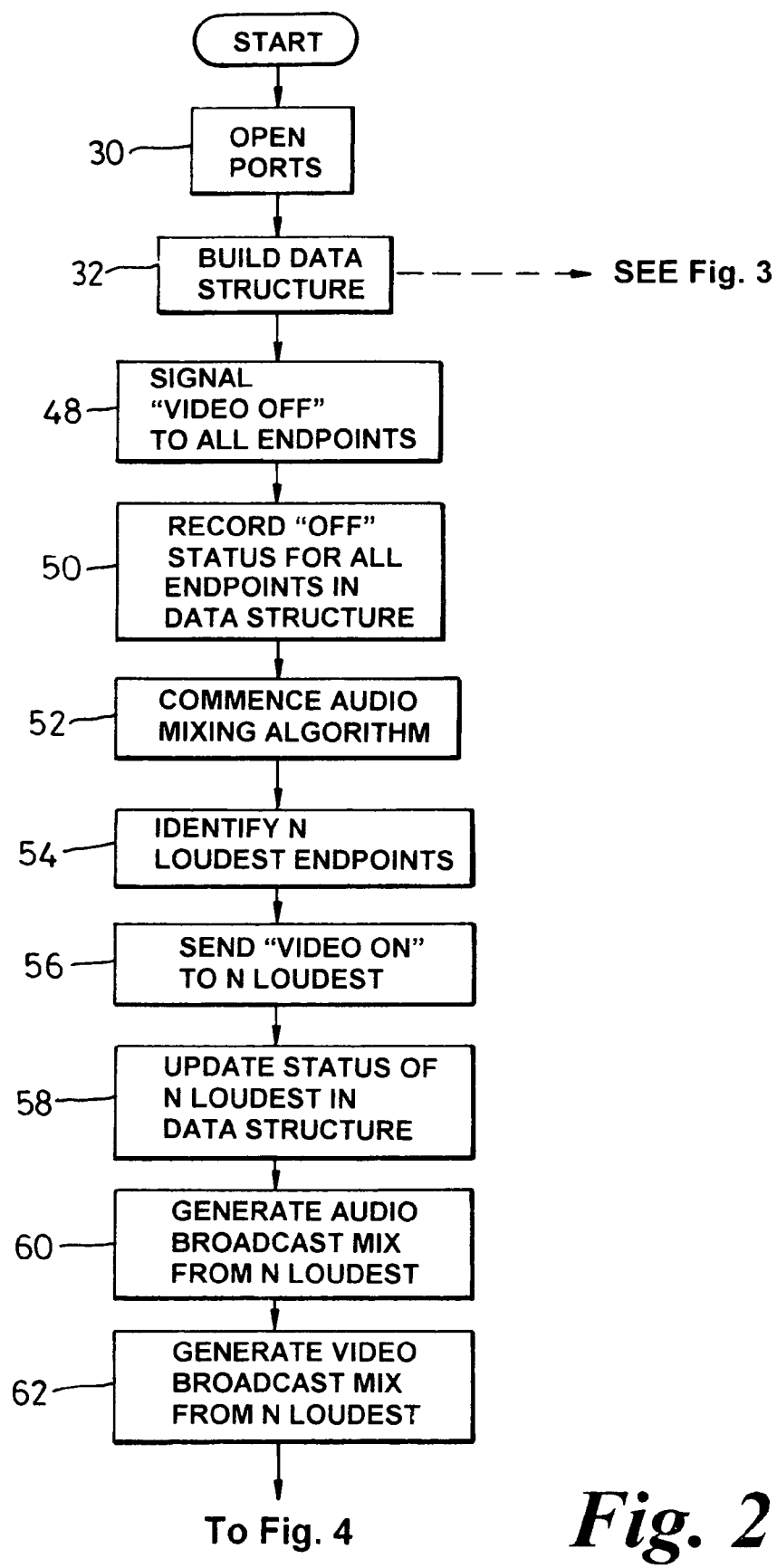
FIG. 2 is a flow diagram illustrating the initial stages of a video conferencing method according to the invention.

FIG. 2 shows the steps carried out by the MCU 20 in managing a conference using the method of the invention. The conference is conducted using the H.323 signalling protocol, although the person skilled in the art will readily recognise that other signalling protocols such as SIP could be used. It will also be clear to a person skilled in the art that the conferencing server could be separate from a call server, with the call server acting as an intermediary for message flows between the conferencing server and the call server.

The MCU begins by opening ports for each endpoint connected to the network, step 30. Each endpoint has ports for each type of media stream and for at least one signalling stream.

The MCU creates and maintains an internal data structure, step 32, for each endpoint in the conference. Referring to FIG. 3, a data structure 34 is shown containing information for all of the endpoints A,B,C,etc. The structure 34 contains the video UDP/IP port numbers 36,38 and audio UDP/IP port numbers 40,42 used for receiving and transmitting video and audio RTP streams as well as the H.245 or signalling port number 44. This data structure is built as part of the call-setup.

A further field in the data structure shows the current status 46 of the video output of each endpoint. In the structure shown, and in the example given below, each endpoint can have either of two states, ON or OFF. However, in cases where the video output from an endpoint can have more states (e.g. OFF, LOW FRAME RATE and HIGH FRAME RATE), this will be reflected in the data structure.

All of the endpoints are initialised by sending a "VIDEO OFF" signal to each endpoint, step 48. This ensures that where an endpoint is set by default to commence transmission of video signals, it is reset to a known state (OFF). The "VIDEO OFF" control signal is sent as a user-to-user message over the H.245 channel associated with each endpoint. This could instead be carried out by a proprietary messaging command.

When the endpoints receive the "VIDEO OFF" command, they each maintain an open logical video transmit (TX) channel, but provide no video output packets to this channel. A non-H.323 terminal (such as terminal 12F, FIG. 1) may continue to transmit video output, but the gateway 16 implements the "VIDEO OFF" command by failing to generate video data packets while in the OFF state.

The OFF status of each endpoint is recorded, step 50, in the current status field 46 of the data structure 34. This can be done by assuming that the "VIDEO OFF" command has been implemented correctly, or each endpoint can be required to send a confirmatory message after every change in status triggered by a control signal from the MCU.

An audio mixing algorithm is commenced on the MCU, step 52, and this algorithm is responsible for the cyclic processing of audio packets arriving from each endpoint. Periodically (e.g. every 100 ms), the audio streams arriving at each UDP port (identified in the above data structures) are mixed, with the mixing algorithm identifying, step 54, the N loudest speakers. N is typically a small number, e.g. 2 or 3.

As a result of this initial identification of the N loudest speakers, the MCU sends a "VIDEO ON" control signal (as a user-to-user message over the H.245 channel) to the endpoints associated with the N loudest speakers, step 56. It does this by identifying the UDP port numbers of the N loudest audio streams in field 40 of the data structure, and looking up the corresponding H.245 ports in field 44 for the identified endpoints.

After sending the "VIDEO ON" command, the data structure is updated by changing the entries in the current status field 46 for the N loudest endpoints from OFF to ON, step 58.

The MCU commences generation of the broadcast audio signals, step 60, and broadcast video signals, step 62. These broadcast mixing processes continue to run in the background according to the rules established by the mixing algorithm. Thus, for example, if N=2, the audio and video signals from the loudest speaker may be transmitted to all other participants and the audio and video from the second loudest speaker transmitted to the loudest speaker. As indicated previously, these rules can be varied widely, and thus the signals of the previous loudest speaker (rather than the current second loudest) might be transmitted to the current loudest speaker. In that case, the data structure would identify the current and previous loudest as ON and all others, including the second loudest as OFF, with the control signals being varied accordingly.

Figure 4:
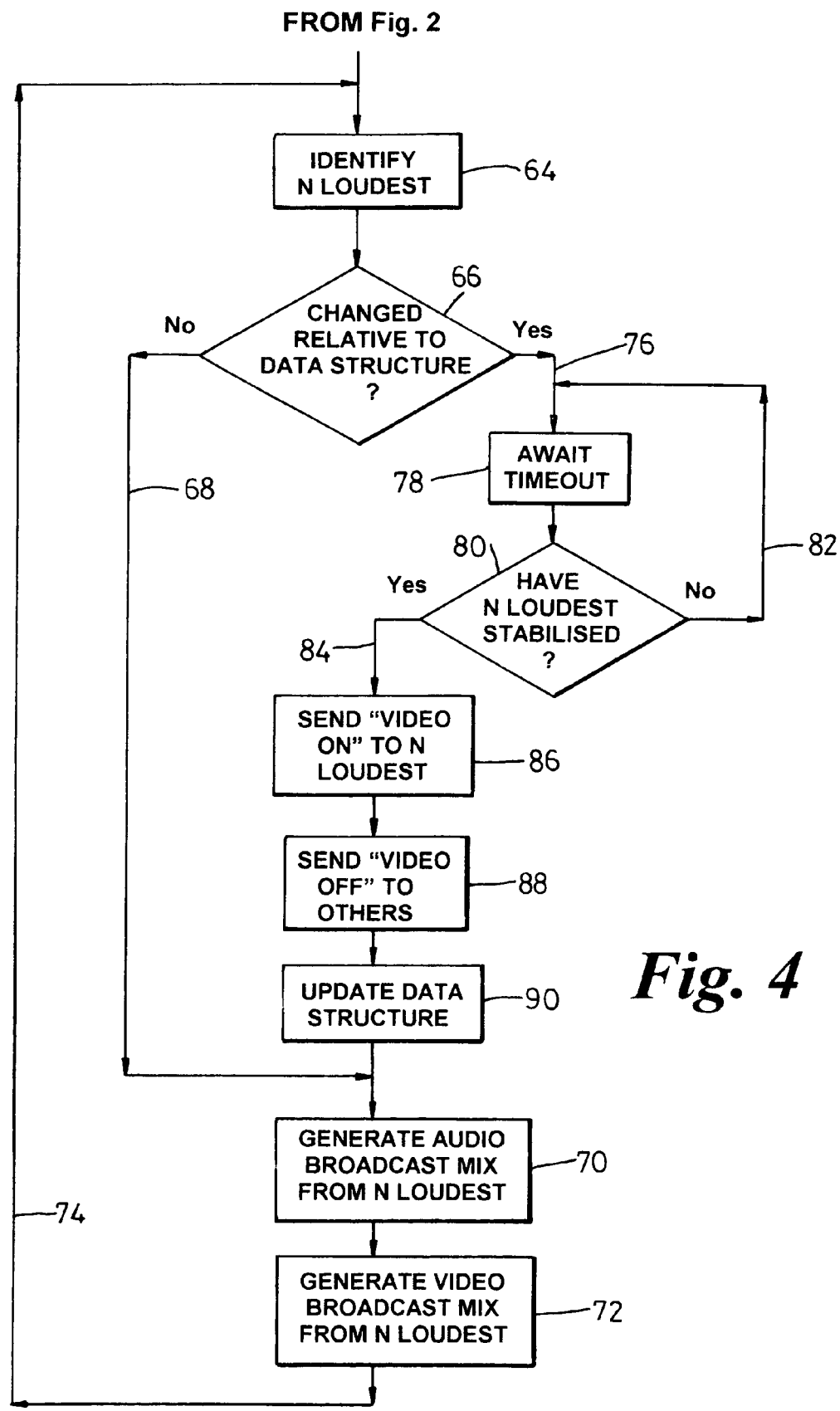
FIG. 4 is a flow diagram illustrating further stages of a video conferencing method according to the invention.

FIG. 4 shows the operation of the MCU once the conference is underway. Periodically, the identity of the N loudest speakers (assuming that this is the algorithm used) is reassessed, step 64.

The identities of the loudest endpoints as determined from the data structure are then compared with the current status, step 66. If there has been no change (i.e. if the N loudest speakers according to this reassessment are those identified as being in the ON state in the current status field 46), then branch 68 is followed, and no action is taken other than to continue to generate the broadcast audio and video signals, steps 70,72, before returning for the next reassessment, following path 74.

If, however, the comparison step 66 indicates that the N loudest speakers are not all in the ON state, branch 76, a hysteresis delay test is initiated, step 78. A timeout is awaited, and the N loudest speakers are again determined, step 80. There are three outcomes to this test, namely that the "new" N loudest speakers remain so when the retesting 80 takes place, that the "old" N loudest speakers are once again the N loudest, or that the identities of the N loudest speakers have again changed to yet a different set of N loudest speakers. The second and third of these outcomes can be treated identically, i.e. the result is that the identities of the N loudest speakers have not stabilised during the timeout. In contrast, the first outcome is taken to mean that over the timeout period the "new" N loudest speakers have remained dominant.

If the N loudest speakers have not stabilised, branch 82 is followed, and the timeout delay is again awaited before a retesting occurs. Until the identities of the N loudest speakers stabilise, the MCU reiterates steps 76,78,80, and as the "old" N loudest are still identified as such in the current status field, the audio and video broadcast mixes remain unchanged. This has the advantage that if the audio signals are in a state of confusion for a short period of time, the video signals seen by participants are not flickering to keep up with the variations.

(Before proceeding it should be mentioned that an alternative method of implementing the hysteresis test is to redirect branch 76 to the beginning of the process (this alternative path is not shown), temporarily noting the new N loudest speakers in a temporary register, and awaiting the periodic polling delay before again redetermining the N loudest speakers, step 64. If the N loudest speakers in the latest redetermination match those in the temporary register, the identities have stabilised, the temporary register is cleared and the alternative process proceeds to the same point as the YES branch (branch 84) from step 80 in the illustrated sequence. If the identities have not stabilised, the latest set of N loudest speakers are substituted into the temporary register, and the process reiterates until a stable set of N loudest is found.)

In any event when a stable new set of N loudest speakers is found, branch 84 is followed, and the MCU sends a "VIDEO ON" message to each of the new N loudest endpoints, step 86. A "VIDEO OFF" message is sent to each endpoint which is not one of the N loudest, step 88, and the data structure is updated, step 90, to ensure that the N loudest are recorded as being ON and all others are OFF.

In the case of an endpoint which is already in the ON state receiving a "VIDEO ON" message, or an endpoint in the OFF state receiving a "VIDEO OFF" message, the messages have no effect and they continue to generate video outputs, or maintain video output silence, as the case may be, as before. Otherwise, the video output is toggled by the message, and the result is that only the N loudest endpoints provide a video output to the data network.

It is to be noted that the MCU could alternatively note that certain endpoints are correctly ON and certain others are correctly OFF, and only send messages to those endpoints whose states must be changed as a result of the new determination of N loudest speakers.

When steps 86,88,90 are complete, the audio broadcast mix and video broadcast mix are adjusted as necessary, steps 70,72, to mix the signals arriving from the new N loudest endpoints, before again returning via path 74 for the next periodic reassessment 64.

The reassessment 64 can be used to record changes in participation, i.e. if an endpoint drops out of the conference, the data structure can be updated accordingly, and if all speakers drop out, the process ends.

Figure 5:
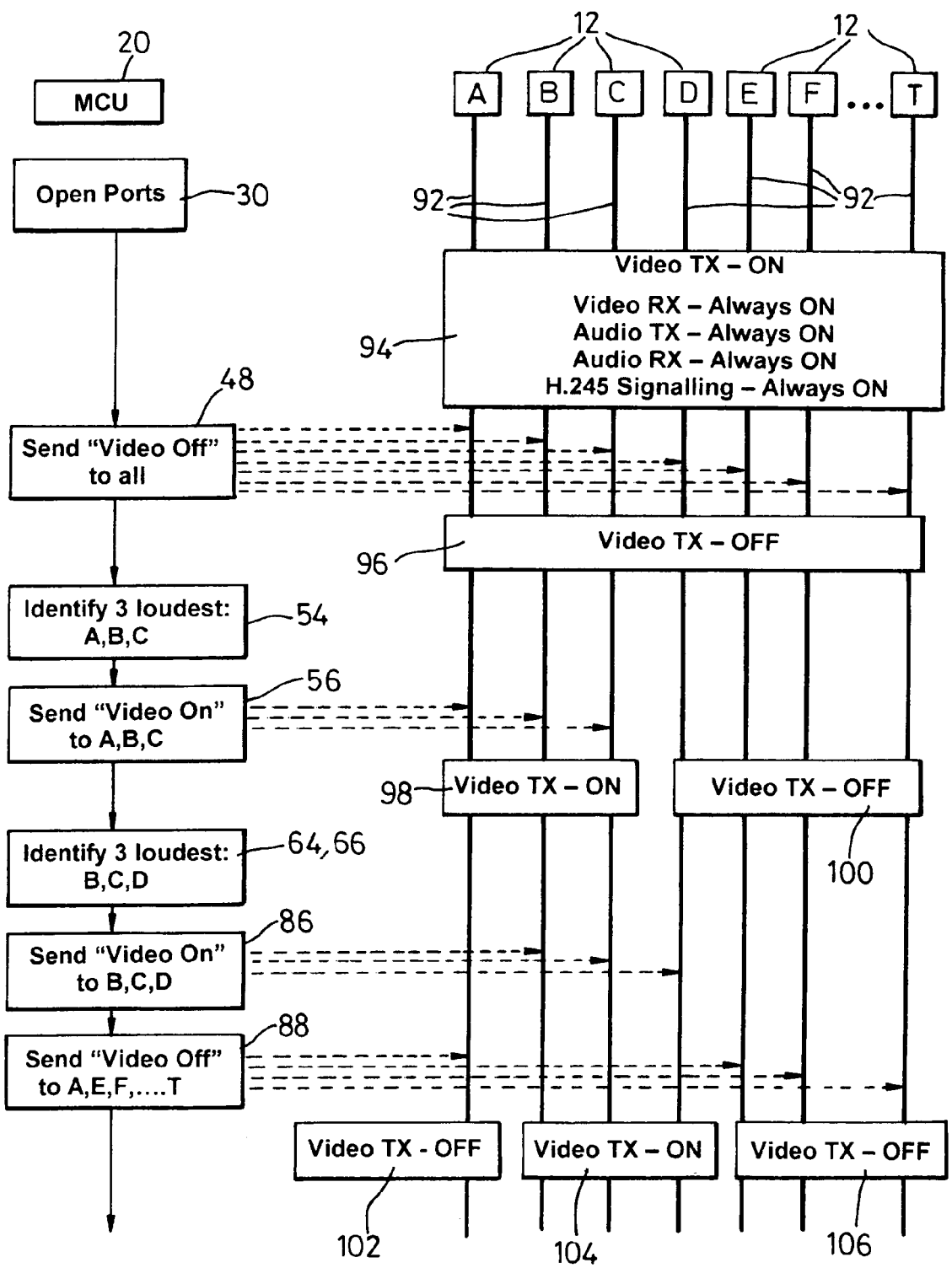
FIG. 5 is an illustration of the signalling occurring between entities involved in the conference described in relation to FIGS. 2–4.

FIG. 5 illustrates the operation in practice of this method for a video conference between twenty endpoints 12, denoted A,B,C, . . . ,T.

The left hand part of FIG. 5 is a flow diagram showing significant steps taken by the MCU 20 during the processes of FIGS. 2 and 4, with the numbering of the steps in FIG. 5 being the same as that used for the same steps in FIGS. 2 and 4.

The right hand part of FIG. 5 shows the endpoints 12A–12T, each having a signalling channel 92 represented by a heavy vertical line extending down from the respective endpoint.

Horizontal broken lines from the left-hand part of FIG. 5 to the right-hand part of FIG. 5 indicate video control signals sent by the MCU 20 to the endpoints 12A–12F.

Status boxes overlying the signal channels in the right-hand part of FIG. 5 illustrate the video output states of the various endpoints 12A–12T at different times. The flow of time is downwards.

When step 30 occurs in the process of FIG. 2, each endpoint is connected by a number of channels to ports on the MCU, the most important channels being those identified in status box 94, namely video transmit (TX), video receive (RX), audio transmit (TX), audio receive (RX), and H.245 signalling. All of these channels are normally established in known systems, and there is effectively a constant flow of data packets along the four media channels (video TX and RX, and audio TX and RX). In the system shown, the endpoints are set up to transmit video by default, and thus the status of video TX at initialisation is ON for all of the endpoints.

As described above, the MCU resets the video outputs as an initial video control step in the FIG. 2 process, step 48. This results in a video status of OFF for all endpoints at the point in time shown by box 96. (The status of each of the other media channels is always ON, so they are not shown after box 92.)

In the initial determination of N loudest endpoints (in this case N=3), step 54, endpoints 12A,12B and 12C are determined to have the loudest signals.

Accordingly, the MCU sends a "VIDEO ON" signal to these three terminals, step 56, and records the updated status as described above.

This results, box 98, in endpoints 12A,12B and 12C generating video output packets and transmitting them to the MCU via the data network (i.e. in the ON state), while leaving the remaining endpoints, box 100, in the OFF state.

The process then enters the iterative loop of FIG. 4, periodically determining the N loudest channels, and only taking substantive action when a change occurs. Supposing the participant at endpoint 12A stops talking and is replaced as one of the N loudest by the participant at terminal 12D. This is identified at steps 64,66, and when the hysteresis test has been completed, a "VIDEO ON" signal is sent to the 3 loudest users, 12B,12C and 12D, step 86. A "VIDEO OFF" signal is similarly sent, step 88, to all other endpoints, i.e. 12A,12E,12F, . . . ,12T.

The control signals sent in steps 86 and 88 have no effect on any endpoints other than 12A and 12D, the states of which are toggled in accordance with the control signals received, as seen by comparing boxes 102,104,106 with boxes 98,100. Further determinations of the N loudest endpoints will then continue to be made in the manner previously described, resulting in similar changes to the video output states when the N loudest speakers again change.

The processes described in FIGS. 2,4 and 5 can be varied by using control signals which change the quality of video output rather than simply toggling the video output on and off at each endpoint. Typically this will be done by the MCU issuing "DECREASE VIDEO QUALITY" or "INCREASE VIDEO QUALITY" messages, which are interpreted by the endpoint control software to change the nature of the video output. Generally, this will be done in a manner which has an effect on the bandwidth occupied by the video outputs, in terms of varying the packet sizes or the numbers of packets. The actual effect on image quality might be that a different frame rate is chosen, or that the picture resolution is changed, or a different compression algorithm might be used (more or less lossy). In general, switching between compression algorithms or codecs during a conference is not preferred as it may give rise to a processor-intensive double encode operation at the server, and therefore, frame rate changes, and pixel size/number changes are to be preferred.

Even where it is intended not to use the video output from a particular endpoint for the time being, this might result in a "DECREASE VIDEO QUALITY" signal issuing to the endpoint rather than a "VIDEO OFF" message. Alternatively, an endpoint might not be set up to continually transmit full-frame images. The endpoint might instead only refresh pixels as they change. For such an endpoint, the "DECREASE VIDEO QUALITY" signal could be interpreted as a signal to stop sending refreshed pixels, and the "INCREASE VIDEO QUALITY" signal might be interpreted as a command to initially send a full-picture frame, and then recommence pixel refreshes. One reason for doing this is that certain video codecs require a number of frames to be built up before the image can be displayed, and therefore in such cases, transitions to images from previously inactive endpoints will be facilitated by maintaining, for each inactive endpoint, a buffer of low-bandwidth video signal (such as 5 frames per second instead of 20 frames per second), which can then be used to quickly generate a video image if the endpoint becomes active in the sense of its video output being transmitted to other endpoints.

In summary, the invention provides a method of controlling video signals in a multi-participant video conference which involves assessing the level of video signal required from each participant to mix the desired broadcast video signals, and using the result of this assessment to dynamically control the video output from the endpoints of the conference participants. The assessment of the required level of video signal preferably utilises an audio mixing algorithm, such that the video outputs of those participants whose audio signals are currently being discarded in the audio mixing process are switched off at the endpoints, or are transmitted in a lower bandwidth format, thereby reducing the overall bandwidth requirements of the conference and reducing processor resources to receive and handle the broadcast video signals.

The invention is not limited to the embodiments described herein which may be varied without departing from the spirit of the invention.

What is claimed is:

1. A method of controlling video signals in a video conference involving a plurality of endpoints, comprising the steps of:
   determining, according to a predetermined function, a degree to which a video signal from an endpoint is to be transmitted to other endpoints within the conference, wherein said determination is selected from: the video signal from said endpoint is not to be transmitted; and the video signal from said endpoint is to be transmitted in a reduced bandwidth format; and
   dynamically controlling a video output from said endpoint as a result of said determination, such that in the case that the video signal from said endpoint is not to be transmitted, dynamically switching off the video output from said endpoint; and in the case that the video signal from said endpoint is to be transmitted in a reduced bandwidth format, reducing the bandwidth of the video output from said endpoint;
   wherein the step of controlling the video output from said endpoint comprises reducing the bandwidth of the video output from said endpoint only during periods when the video signals from said endpoint are being transmitted to other endpoints in a reduced bandwidth format.

2. A method according to claim 1, wherein the video conference forms part of a multimedia conference, said multimedia conference further including an audio conference between said plurality of endpoints.

3. A method according to claim 2, wherein the determination of the degree to which said video signal is to be transmitted to other endpoints within the conference comprises analysing audio signals from the endpoints.

4. A method according to claim 3, wherein said analysis of audio signals comprises applying an audio mixing algorithm to said audio signals, and using a result of said algorithm to determine the degree to which said video signal is to be transmitted to other endpoints within the conference.

5. A method according to claim 4, wherein said audio mixing algorithm results in audio signals from only a subset of said plurality of endpoints being transmitted to the plurality of endpoints.

6. A method according to claim 5, wherein the video signals from only said subset of endpoints are transmitted to said plurality of endpoints.

7. A method according to claim 5, wherein the video signals from said subset of endpoints are transmitted to said plurality of endpoints as higher quality video images than the video signals from the other endpoints outside said subset.

8. A method according to claim 4, wherein the method is applied to more than one endpoint of the plurality of endpoints.

9. A method according to claim 8, wherein the method is applied to all of the endpoints in the conference.

10. A method according to claim 1, wherein said lower bandwidth video output is provided by reducing the frame rate of the video output.

11. A method according to claim 1, wherein said conference is carried out on a packet-based data network and wherein said lower bandwidth video output is provided by altering the video output to provide a reduced packet size.

12. A method according to claim 1, wherein said conference is carried out on a packet-based data network and wherein said lower bandwidth video output is provided by altering the video output to provide reduced numbers of packets from said endpoint.

13. A method according to claim 1, wherein the method is applied to more than one endpoint of the plurality of endpoints.

14. A method according to claim 1, wherein the method is applied to all of the endpoints in the conference.

15. A method of controlling video signals in a multimedia conference involving a plurality of endpoints communicating with at least audio and video signals over a packet-based data network, comprising the steps of:
   applying an audio mixing algorithm to said audio signals, and using a result of said algorithm to determine a degree to which the video signals from one or more endpoints are to be transmitted to other endpoints within the conference, wherein said determination is selected from: the video signal from said endpoint is not to be transmitted; and the video signal from said endpoint is to be transmitted in a reduced bandwidth format; and
   dynamically varying a video output from said one or more endpoints as a result of said determination, such that in the case that the video signal from said endpoint is not to be transmitted, dynamically switching off the video output from said endpoint; and in the case that the video signal from said endpoint is to be transmitted in a reduced bandwidth format, reducing the bandwidth of the video output from said endpoint;

wherein the step of dynamically varying the video output from said endpoint comprises reducing the bandwidth of the video output from said endpoint only during periods when the video signals from said endpoint are being transmitted to other endpoints in a reduced bandwidth format.

16. A method according to claim 15, wherein the step of varying the video output from said one or more endpoints comprises sending a control signal to said one or more endpoints said control signal being selected from a control signal effective to cause the endpoint to cease video output, a control signal effective to cause the endpoint to commence video output, a control signal effective to cause the endpoint to reduce the bandwidth of the video output, and a control signal effective to cause the endpoint to increase the bandwidth of the video output.

17. A method according to claim 15, wherein the variation in video output occurs effectively instantaneously as the result of said algorithm varies over time.

18. A method according to claim 15, wherein the variation in video output is subject to a hysteresis delay to compensate for short-lived variations in the result of said algorithm over time.

19. A method of controlling a multimedia conference involving a plurality of endpoints communicating with at least audio and video signals over a packet-based data network, comprising the steps of:

selecting the audio signals from a subset of said endpoints and generating therefrom at least one broadcast audio signal for transmission to the plurality of endpoints;

selecting the video signals from said subset of endpoints and generating therefrom at least one broadcast video signal for transmission to the plurality of endpoints; and dynamically controlling a video output from each of the plurality of endpoints other than said at least one broadcast video signal for transmission to the plurality of endpoints in accordance with the characteristics of video signal required from each endpoint to generate the broadcast video signal, such that in the case that the video signal from a given endpoint is not to be transmitted to the other endpoints, dynamically switching off the video output from said endpoint; and in the case that the video signal from a given endpoint is to be transmitted in a reduced bandwidth format to other endpoints, reducing the bandwidth of the video output from said endpoint;

wherein the step of controlling the video output from each of the plurality of endpoints other then said at least one broadcast video signal comprises reducing the bandwidth of the video output from said endpoint only during periods when the video signals from said endpoint are being transmitted to other endpoints in a reduced bandwidth format.

20. A multimedia conferencing server comprising:

a plurality of audio and video ports for connecting endpoints to the server via a data network over audio and video channels, respectively;

a memory unit for associating the audio and video channels from each endpoint;

an audio processing unit for receiving audio signals from said audio ports and generating therefrom broadcast audio signals for transmission to the endpoints via said ports;

a video processing unit for receiving video signals from said video ports and generating therefrom broadcast video signals for transmission to the endpoints via said ports; and a control unit for generating control signals to control the video outputs from said endpoints as required to generate said broadcast video signals;

wherein said video processing unit operates to generate said broadcast video signals utilising the video signal from at least one endpoint to a greater degree than the video signal from at least one other endpoint; and wherein said control unit operates to generate said control signals to control the bandwidth of a video output from said at least one endpoint and said at least one other endpoint in accordance with the degree of utilisation of the respective video signals from said endpoints in the broadcast video signals, such that in the case that the video signal from said at least one other endpoint is not to be transmitted, dynamically switching off the video output from said endpoint; and in the case that the video signal from said at least one other endpoint is to be transmitted in a reduced bandwidth format, reducing the bandwidth of the video output from said endpoint;

wherein the control signals operate to reduce the bandwidth of the video output from said endpoint only during periods when the video signals from said endpoint are being transmitted to other endpoints in a reduced bandwidth format.

21. A multimedia conferencing server according to claim 20, further comprising a plurality of signalling ports for connecting endpoints to the control unit of the server via said data network over signalling channels, whereby said control signals may be issued directly from the server to the endpoints.

22. A multimedia conferencing server according to claim 20, further comprising one or more control channel ports for connection to a call server, said endpoints being connected to said call server over signalling channels, whereby said control signals may be relayed from the conferencing server to the endpoints via said call server.

23. A multimedia conferencing system comprising a conference server and a call server, wherein the conferencing server comprises:

a plurality of audio and video ports for connecting endpoints to the conferencing server via a data network over audio and video channels, respectively;

a memory unit for associating the audio and video channels from each endpoint;

an audio processing unit for receiving audio signals from said audio ports and generating therefrom broadcast audio signals in accordance with for transmission to the endpoints via said ports;

a video processing unit for receiving video signals from said video ports and generating therefrom broadcast video signals for transmission to the endpoints via said ports;

a control unit for generating control signals to control the video outputs from said endpoints as required to generate said broadcast video signals; and one or more control channel ports for connection to said call server;

wherein said video processing unit operates to generate said broadcast video signals utilising the video signal from at least one endpoint to a greater degree than the video signal from at least one other endpoint;

wherein said control unit operates to generate said control signals to control the bandwidth of a video output from said at least one endpoint and said at least one other endpoint in accordance with the degree of utilisation of the respective video signals from said endpoints in the broadcast video signals, such that in the case that the video signal from said at least one other endpoint is not to be transmitted, dynamically switching off the video output from said endpoint; and in the case that the video signal from said at least one other endpoint is to be transmitted in a reduced bandwidth format, reducing the bandwidth of the video output from said endpoint; and wherein the control signals operate to reduce the bandwidth of the video output from said endpoint only during periods when the video signals from said endpoint are being transmitted to other endpoints in a reduced bandwidth format, and wherein the call server comprises:

a plurality of signalling ports for connecting said endpoints to the conferencing server via said data network over a signalling channel;

whereby said control signals may be relayed from the conferencing server to the endpoints via said call server.

24. A multimedia conferencing system according to claim 23, further comprising a data network for carrying said audio, video and control signals, and a plurality of endpoints connected to said conference server and call server via the data network.

25. A multimedia conferencing system according to claim 24, wherein said data network is a packet-based data network.

26. A multimedia conferencing system according to claim 24, wherein one or more of said plurality of endpoints are logical entities comprising a number of distinct physical devices.

27. A computer program product containing instructions in machine readable form which when executed cause a computer associated with a video conference server to:

determine, according to a predetermined function, a degree to which a video signal from an endpoint communicating with the server is to be transmitted to other endpoints communicating with the server, wherein said determination is selected from: the video signal from said endpoint is not to be transmitted; and the video signal from said endpoint is to be transmitted in a reduced bandwidth format; and issue control signals based on said determination to said endpoint to dynamically control a video output therefrom, such that in the case that the video signal from said endpoint is not to be transmitted, dynamically switching off the video output from said endpoint; and in the case that the video signal from said endpoint is to be transmitted in a reduced bandwidth format, reducing the bandwidth of the video output from said endpoint;

wherein the control signals operate to reduce the bandwidth of the video output from said endpoint only during periods when the video signals from said endpoint are being transmitted to other endpoints in a reduced bandwidth format.

28. A computer program product according to claim 27, wherein said computer determines the degree to which said video signal from said endpoint is to be transmitted by analysing audio signals sent from the endpoints to the server.

29. A computer program product according to claim 28, wherein said analysis of audio signals is carried out by the computer applying an audio mixing algorithm to said audio signals, and using a result of said algorithm to determine the degree to which said video signal is to be transmitted to other endpoints within the conference.

30. A computer program product according to claim 27, wherein said control signals are effective to stop or start transmission of the video output from said endpoint.

31. A computer program product according to claim 27, wherein said control signals are effective to increase or decrease the bandwidth of the video output from said endpoint.

32. A computer program product according to claim 31, wherein said control signals are effective to reduce or increase the frame rate of the video output from said endpoint.

33. A computer program product according to claim 31, wherein said control signals are effective to reduce or increase the image resolution of the video output from said endpoint.

34. A computer program product according to claim 31, wherein said control signals are effective to change a video codec of the video output from said endpoint.

35. A computer program product according to claim 27, wherein when said computer determines a change in the degree to which said video signal is to be transmitted, said instructions are further effective to cause the computer to observe a hysteresis delay before issuing different control signals to said endpoint.

36. A computer program product according to claim 35, wherein when said computer determines, within said hysteresis period, a reversal of said change in the degree to which said video signal is to be transmitted, said instructions are further effective to prevent the computer from issuing different control signals to said endpoint.

37. A computer program product according to claim 27, wherein when said instructions are further effective to cause the computer to maintain a data structure in which the current status of the video output from said endpoint is recorded.

* * * * *